April 27, 1926.
F. A. REINHARD
WINDSHIELD CLEANER
Filed April 19, 1924
1,582,348
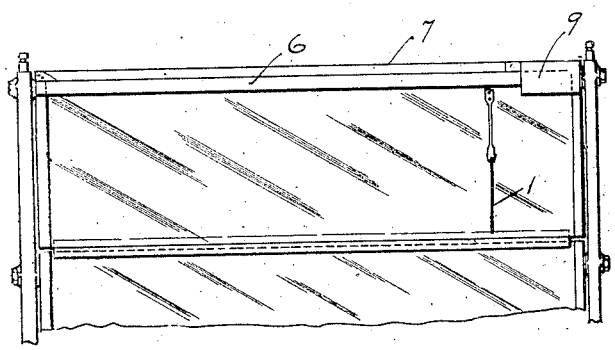
Fig 1
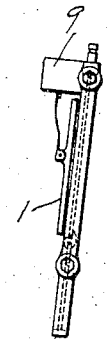
Fig 2
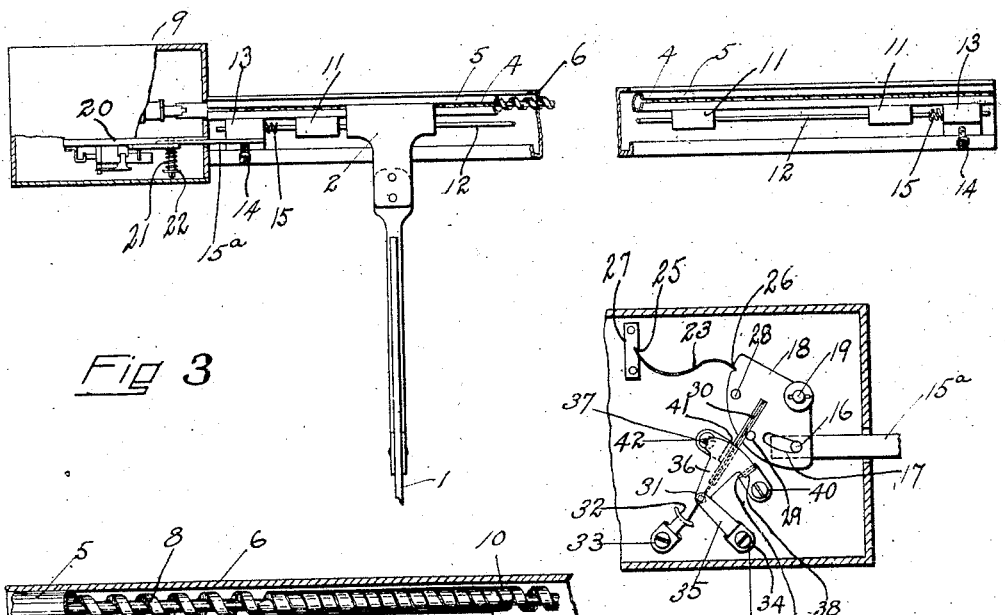
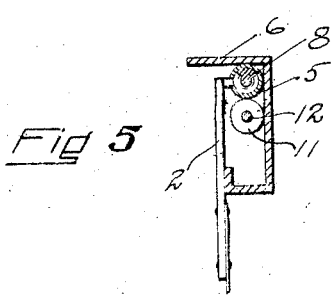
INVENTOR
Frank A. Reinhard
by Charles W. McDermott
his attorney.

Patented Apr. 27, 1926.

1,582,348

UNITED STATES PATENT OFFICE.

FRANK A. REINHARD, OF WAKEFIELD, MASSACHUSETTS, ASSIGNOR TO UTILITY MANUFACTURING AND SALES CORPORATION, OF BOSTON, MASSACHUSETTS, A CORPORATION OF MASSACHUSETTS.

WINDSHIELD CLEANER.

Application filed April 19, 1924. Serial No. 707,729.

*To all whom it may concern:*

Be it known that I, FRANK A. REINHARD, a citizen of the United States, residing at Wakefield, in the county of Middlesex and State of Massachusetts, have invented certain Improvements in Windshield Cleaners, of which the following description, in connection with the accompanying drawings, is a specification, like reference characters on the drawings indicating like parts in the several figures.

This invention relates to windshield cleaners, and more particularly to power operated windshield cleaners, for wiping clear across the windshield.

It has been proposed heretofore to reciprocate a wiper back and forth across the entire width of a wind shield through the use of a rotary screw shaft and a nut arranged to travel back and forth thereon, the nut comprising a support for the wiper. When the wiper reached its limit of movement in one direction the rotary shaft was reversed to cause the wiper to reciprocate back across the wind shield in the other direction. The screw shaft was rotated by an electric motor which received its current from the usual storage battery employed on motor cars. In all the rotary screw shaft and travelling nut types of windshield cleaners heretofore proposed the screw shaft extended substantially the entire width of the windshield being supported at its opposite ends only. This manner of supporting the screw shaft required the use of a large dimensioned shaft stiff and heavy enough to resist any tendency of the shaft to sag along its unsupported length. The nut also was made large as it was designed to embrace the shaft and engage every portion of the thread on the shaft. Experience demonstrated that this heavy screw shaft and travelling nut construction used an excessive amount of battery current as their instantaneous reversal threw a tremendous burden on the motor. For this reason clear across wind shield cleaners have not been successful although an urgent need for them is felt by motor car users.

The principal object of the present invention is to produce a wind shield cleaner of the rotary screw and travelling nut type which will be extremely economical in its use of battery current.

To the accomplishment of this object a feature of the invention contemplates the provision in a wind shield cleaner having a wiper and means for reciprocating the wiper comprising a rotary screw shaft, of means for supporting the shaft substantially throughout its length. With this construction a shaft of minute size may be employed as all danger of its sagging is resisted by the bearing or support.

Broadly considered the travelling nut may have any desired construction as substantially all the strain placed upon the motor at the moment of reversal is due to the inertia of the shaft. It is preferred, however, to employ a travelling nut which engages the root and sides only of the thread on the shaft as with this construction the nut may slide back and forth in the bearing for the shaft without affecting the shaft supporting function of the bearing.

A further object of the invention is to devise a wind shield cleaner which will be simple and compact in construction, which can be economically manufactured, which will be reliable in operation, and which will not be subject to rapid wear or deterioration. To these ends the invention involves certain novel devices, combinations and arrangements of parts and details of construction which will be fully described hereinafter and the novel features of which will be pointed out in the appended claims.

The various features of the present invention will be readily understood from an inspection of the accompanying drawings illustrating the best form of the invention at present known to the inventor, in which,—

Figure 1 is a front elevation of the wind shield cleaner;

Fig. 2 is a left side elevation;

Fig. 3 is a broken view in rear elevation a fragmentary section of the motor housing being shown at the left;

Fig. 4 is a detail sectional plan of the threaded shaft and the parts associated therewith;

Fig. 5 is a detail in left side sectional elevation on the line 5—5, Fig. 1;

Fig. 6 is a detail in bottom plan of the reversible switch for the electric motor; and Fig. 7 is a detail showing of the helical coil and the fin of the wiper support.

In the illustrated embodiment of the invention a wiper 1 of a well known type is carried by a wiper support 2 (Fig. 2) provided with a lateral fin 3 (Fig. 4) which travels in a slot 4 (Fig. 3) formed longitudinally in a tube 5 (Figs. 8 and 4). The tube 5 is brazed throughout its length to a frame 6 (Fig. 5) brazed or otherwise secured to the wind shield frame 7 (Fig. 1).

Mounted within the tube 5 so that it has a running fit throughout its length is a small threaded shaft 8 which is driven directly from an electric motor (not shown) secured to a housing 9 (Fig. 3) on the frame 6. Secured to the fin 3 of the wiper support is a helical coil 10 (Figs. 4 and 7) which engages the root and sides only of the thread in the shaft 8.

The helical coil 10 together with the wiper support is readily assembled with the shaft 8 by threading the coil into the thread at one end of the shaft. As the helical coil engages only the root and sides of the thread on the shaft the diameter of the assembled shaft and coil is not increased over the diameter of the shaft alone.

With this construction rotation of the shaft 8 causes the wiper support 2 to reciprocate along the tube 5 and thus carry the wiper 1 clear across the wind shield. As the tube 5 supports the shaft 8 throughout its length all liability of the shaft sagging under its own weight or road shocks is avoided. The tube 5 is open at both ends so that the helical coil 10 can work accumulation of dirt out of the threads in the shaft 8.

In order that the shaft 8 may be rotated alternately in opposite directions to transfer the wiper back and forth across the wind shield the tube 5 carries a number of ways 11 (Fig. 3) through which a rod 12 slides. Near each end the rod 12 carries a block 13 (Fig. 3) secured to the rod by a screw 14. Seated in a chamber formed in the block 13 is a spring 15. As the wiper support approaches the side frame of the wind shield it engages one of the springs 15, compresses it and then through the compressed spring moves the associated block 13 in the direction of travel of the wiper support and thus slides the rod 12 in the ways 11.

The sliding movement of the rod 12 is utilized to reverse the poles of the electric motor and thus cause it to rotate alternately in opposite directions. To this end the left-hand block 13 (Fig. 3) carries a link 15ª (Fig. 6) which is provided with a pin 16 which engages a curved slot 17 formed in a plate 18 pivoted on a pin 19 secured to a shelf 20 (Fig. 3) on the housing 9. To hold the plate 18 in place the pin 19 is extended and a spring 21 (Fig. 3) coiled around the pin is interposed between the plate 18 and a washer 22 on the end of the pin.

The plate 18 has a limited pivotal movement on the shelf 20 so that at all times the pin 16 is at one end or the other of the slot 17. To this end the opposite ends of a leaf spring 23 are held in slots 25 and 26 formed in a support 27 carried by the shelf 20 and in the periphery of the plate 18, respectively. Normally the spring 23 holds the plate 18 so that the pin 16 is at one end or the other of the slot 17. The spring 23 and the slots 25 and 26 are so arranged that when the plate 18 is turned to move the pin 16 from one end of the slot 17 to the other the spring 23 first reaches a dead center and then as it passes this dead center the spring operates quickly to actuate the plate 18 to its other extreme of movement. This construction insures the retention of the plate 18 in a position ready for the next reversal of the poles of the electric motor.

In order to reverse the poles of the electric motor the plate 18 carries two pins 28 and 29 arranged to alternately engage insulated surfaces on an arm 30 pivoted at 31 to the shelf 20. The rear end of the arm 30 makes an electrical contact with a curved face 32 formed on a terminal 33 which leads to the armature of the electric motor. A terminal 34, which leads to one terminal of the storage battery, is electrically connected through an arm 35 to a plate 36 carried by, but insulated from, the arm 30. The plate 36 is provided with depending lugs 37 and 38 (Fig. 6). The lug 38 (Fig. 6) engages a ledge 39 formed on a terminal 40 which leads to one side of the field of the electric motor. The lug 37 on the plate 36 is, in the position of (Fig. 6), out of contact with a ledge 41 formed on a terminal 42 which leads to the other side of the field of the electric motor. As shown in Fig. 6 the spring 23, through the plate 18 and pin 29, holds the arm 30 in contact with the ledge 41. With this construction the electric current passes from the battery to the terminal 34, thence through the arm 35 to the plate 36, then through the terminal 40 to one side of the field, through the field to terminal 42, arm 30, contact face 32 and terminal 33 to the armature and back to the other terminal of the battery. When the arm 15ª is moved to the right (Fig. 6) the plate 18 turns until the pin 28 engages the arm 30 at which time the spring 23 passes beyond its dead center and the plate 18 is moved over, disconnecting the arm 30 from terminal 42 and plate 36 from terminal 40, bringing the arm 30 in contact with terminal 40 and the plate 36 in contact with terminal 42 and also bringing the pin 16 in position at the other end of slot 17 for the next reversing operation.

The direction of current is thus changed so it passes from the battery through the terminal 34, arm 35, plate 36, terminal 42, the fields, terminal 40, arm 30, through the terminal 33 to the armature back to the battery. The poles of the electric motor are thus reversed alternately in order to rotate the shaft alternately in opposite directions and thus reciprocate the wiper back and forth across the wind shield.

From the construction of the reversing switch disclosed herein it will be apparent to those skilled in the art that the electric motor employed to drive the threaded shaft is series wound as that type of motor is best suited for the duty. If, however, a shunt wound motor was used it is apparent that a different type of reversing switch would be employed.

What is claimed as new, is:

1. A wind shield cleaner, having, in combination, a wiper, means for reciprocating the wiper comprising a rotary screw shaft, and means for supporting the shaft substantially throughout its length.

2. A wind shield cleaner, having, in combination, a wiper, means for reciprocating the wiper comprising a rotary screw shaft, and a tube within which the shaft has a running fit substantially throughout its length.

3. A wind shield cleaner, having, in combination, a wiper, and means for reciprocating the wiper comprising a rotary screw shaft and a device arranged to engage the root and sides only of the thread on the shaft.

4. A wind shield cleaner, having, in combination, a wiper, means for reciprocating the wiper comprising a rotary screw shaft and a device arranged to engage the root and sides only of the thread on the shaft, and a tube within which the shaft has a running fit substantially throughout its length.

5. A wind shield cleaner, having, in combination, a wiper support, a threaded shaft, a non-rotatable nut carried by the wiper support and arranged to engage the root and sides only of the thread on the shaft.

6. A wind shield cleaner, having, in combination, a wiper support, a threaded shaft, a non-rotatable nut carried by the wiper support and arranged to engage the thread on the shaft, and a bearing for the shaft engaged with the shaft substantially throughout its length.

7. A wind shield cleaner, having, in combination, a wiper support, a threaded shaft, a non-rotatable nut carried by the wiper support and arranged to engage the root and sides only of the thread on the shaft, and a bearing for the shaft engaged with the shaft substantially throughout its length.

8. A wind shield cleaner, having, in combination, a tube extending across the wind shield and provided with a longitudinal slot, a threaded shaft having a running fit in the tube, a wiper support mounted to slide along the slot, and a device carried by the wiper support engaged with the root and sides only of the thread on the shaft.

9. A wind shield cleaner, having, in combination, a tube extending across the wind shield and provided with a longitudinal slot, a threaded shaft having a running fit in the tube, a wiper support mounted to slide along the slot, and an helical coil carried by the wiper support engaged with the root and sides only of the thread on the shaft.

10. A wind shield cleaner, having, in combination, a tube extending across the wind shield open at both ends and provided with a longitudinal slot, a threaded shaft having a running fit in the tube, a wiper support, and a splined helical coil carried by the wiper support engaged with the root and sides only of the thread on the shaft.

11. A wind shield cleaner, having, in combination, a frame, a tube secured to the frame and provided with a longitudinal slot, a threaded shaft mounted within the tube, a wiper support arranged to slide on the frame, a lateral fin on the wiper support arranged to slide in the slot on the tube, and a helix carried by the fin engaged with the thread on the shaft.

12. A wind shield cleaner, having, in combination, a frame, a tube secured to the frame, a threaded shaft mounted within the tube, a wiper support, having a running fit in the tube and a device carried by the wiper support engaged with the thread on the shaft, and an electric motor for driving the shaft housed on the frame.

In testimony whereof I have signed my name to this specification.

FRANK A. REINHARD.